(12) United States Patent
Tseng (10) Patent No.: US 6,461,092 B2
(45) Date of Patent: Oct. 8, 2002

(54) ANTI-DEAD LOCKING, ANTI-VIBRATION AND LOOSENING-PROOF BOLT/NUT STRUCTURE

(76) Inventor: Shao-Chien Tseng, No. 130, Sec. 2, Yang-Shin Rd., Yang-Mei, Taoyuan (TW)

( * ) Notice: Subject to any disclaimer, the term of this patent is extended or adjusted under 35 U.S.C. 154(b) by 0 days.

(21) Appl. No.: 09/791,455

(22) Filed: Feb. 22, 2001

(65) Prior Publication Data

US 2002/0114681 A1 Aug. 22, 2002

(51) Int. Cl.[7] .......................... F16B 35/02; F16B 37/08
(52) U.S. Cl. ........................ 411/383; 411/178; 411/433; 411/438
(58) Field of Search ............................ 411/16, 17, 178, 411/383, 432, 433, 438

(56) References Cited

U.S. PATENT DOCUMENTS

| | | | |
|---|---|---|---|
| 1,468,074 A | * 9/1923 | Peirce | 411/16 |
| 2,842,999 A | * 7/1958 | Huston | 411/16 |
| 2,888,853 A | * 6/1959 | Pachmayr | 411/438 |
| 4,040,326 A | * 8/1977 | Breed | 411/438 X |
| 6,276,883 B1 | * 8/2001 | Unsworth et al. | 411/438 X |

* cited by examiner

*Primary Examiner*—Neill Wilson
(74) *Attorney, Agent, or Firm*—Pro-Techtor International Services (57) ABSTRACT

An improved bolt/nut structure capable of preventing from dead locking and loosening and being vibration resistive, wherein, an internal threaded lining and an external threaded sleeve are made from helix springs with the cross section of each ring thereof in the shape of "]" and are used as an external thread and an internal thread for the bolt and the nut respectively to provide the function of dead locking and loosening and of vibration resisting. A plurality of expansion slits are provided on the internal and external peripheries of the helix springs, the springs with the expansion slits are suitable for use on the surface with collapsing of screw threads to suitably expand, and to confine the screw threads respectively. Moreover, a single or a plurality of helix springs are provided to form the internal threaded lining or the external threaded sleeve of one of various pitch gauges, thereby, the bolt structure has the capability of changing for the coarse and fine threads.

5 Claims, 13 Drawing Sheets

ANTI-DEAD LOCKING, ANTI-VIBRATION AND LOOSENING-PROOF BOLT/NUT STRUCTURE

BACKGROUND OF THE INVENTION

1. Field of the Invention

The present invention is related to an improved bolt/nut structure capable of preventing from dead locking and loosening and being vibration resistive; and especially to such an improved bolt/nut structure which is manufactured to have thereon an internal threaded lining and an external threaded sleeve of one of various pitch gauges, thereby, the bolt/nut structure can have the capability of changing for coarse and fine threads, and can be used in the assembling circumstances where the screw threads collapse. This can provide the effects of preventing from dead locking and loosening and of being vibration resistive.

2. Description of the Prior Art

Conventional locking technique for bolts and nuts provides mainly on the bolts and nuts internal and external screw threads, by engaging and rotating leading between the external threads and internal threads, tight axial clamping or rotation leading action can be obtained.

However, it has been known that, among various circumstances where articles are locked by screw threads in the markets, such as in the screw coupling between the car transmission shaft and a wheel rim, the screw coupling between the airplane housings, and in the mechanical transmission members on a tunnel drilling machine with high vibrational frequency, on an oil drilling machine, a pile driver, an engine, an internal combustion engine, an air compressor and an oil compressor etc., extremely large vibration exists, so that the screw connections are subjected to loosening or breakage of screw threads.

To overcome such a trouble, however, there is only a locking technique for bolts and nuts (referring to U.S. Pat. No. 5,961,266 granted to the owner of the present invention). Wherein, the shank of a bolt is provided with a lot of axial teeth, cooperating with an external threaded sleeve in the form of a helix spring of which the wall of a hole is formed to have a lot of engaging internal teeth, in this way, the axial teeth on the shank of the bolt is engaged with the external threaded sleeve having spring nature, by the engagement of the axial teeth with the engaging internal teeth, the rotation action force in screwing tight the bolt can be transmitted, the spring nature of the external threaded sleeve can absorb the external vibration force, and can increase the engaging force between the teeth, thereby, the effects of anti-dead locking and anti-vibration can be obtained. Further, the nut is provided therein with a hole having a plurality of axial internal engaging teeth, in cooperation with an internal threaded lining in the form of a helix spring, the external wall of the internal threaded lining is made to have external engaging teeth, thereby the nut provided with the hole having a plurality of axial internal engaging teeth is engaged with the internal threaded lining having internal threads with the nature of a spring and thus can effect an engaging action between the internal engaging teeth and the external engaging teeth. In transmitting the rotational force for screwing tight the nut, the external vibration force can also be absorbed by the spring nature of the internal threaded lining, and the engaging force between the internal and external teeth can be increased; and thereby the effects of anti-dead locking, anti-vibration and loosening proofing can be obtained. However, the internal threaded lining and the external threaded sleeve are in the form of helix springs in order to match and connect with the nut and the bolt, they are required to be made to have thereon internal external engaging teeth and thus are expensive in production cost, and are not suitable for fine pitch gauges of threads, they are not good in the effect of assembling when facing to the cases of collapsing screw threads.

And the way to deal with the problem of collapsing of screw threads in the art is to enlarge the surface with collapsing of screw threads by boring, then new screw threads are tapped with a tapping tool, and a new protecting sleeve is provided on the bolt or the new tapped screw threads. In this way, an object of repairing the surface with collapsing of screw threads can be achieved, and coupling strength of the screw threads can be effectively increased. However, in practice, the process includes boring, tapping and providing protecting sleeves etc., it is inconvenient in practicing, and is not suitable for machines with vibration.

To thoroughly solve the abovementioned conventional defects of inability of getting the effects of anti-dead locking, anti-vibration and loosening proofing or of having higher production cost and being not good in the effect of assembling when facing to the cases of collapsing screw threads, and the defect of being cumbersome in practicing the new protecting sleeves as well as inferior anti-vibration and loosening-proofing, is the motive of studying and developing of the present invention.

SUMMARY OF THE INVENTION

The object of the present invention is to provide an improved anti-dead locking, anti-vibration and loosening-proof bolt/nut structure which is manufactured to have thereon an internal threaded lining or an external threaded sleeve of one of various pitch gauges, thereby, the bolt/nut structure has the capability of changing for the coarse and fine threads, and can be used in the assembling circumstances where the screw threads collapse. This can provide the effect of preventing from dead locking and loosening and of being vibration resistive, and can have the advantage of being cost low.

To get the above object, the present invention in practice has the following advantages:

The internal threaded lining and the external threaded sleeve are respectively provided for the bolt and the nut to be used as an elastic external thread and an elastic internal thread to provide the function of dead locking and loosening and of vibration resisting.

With a plurality of internal and external expansion slits on the internal and external peripheries of the helix springs with the cross section of each ring thereof in the shape of "]", the springs are suitable for use on the surface with collapsing of screw threads in a simple and easy way. Moreover, the process of manufacturing includes providing a plurality of expansion slits on the internal and external peripheries of the helix springs and then the bodies are bent into the shape of the helix springs with a winding machine. Thereby, its process is simpler and easier, and its production cost is lower than that of the anti-dead locking, anti-vibration and loosening-proof bolt/nut structure stated in the technique of the U.S. Pat. No. 5,961,266.

A single or a plurality of helix springs can be provided to form the internal threaded lining or the external threaded sleeve of one of various pitch gauges, thereby, the bolt or the nut structure has the capability of changing for the coarse and fine threads.

With the above statement, the improved anti-dead locking, anti-vibration and loosening-proof bolt/nut structure of the present invention can be used for rotating locking with a conventional nut or bolt, or can be used in a combined way. It is sure that, when in assembling in a closed type hole with screw threads without using a nut structure, the bolt structure of the present invention can be singly used for assembling in the closed type hole with screw threads to get the effects of anti-dead locking, anti-vibration and loosening-proofing, and is suitable for using in the assembling circumstances where the screw threads collapse as well.

The present invention will be apparent after reading the detailed description of the preferred embodiment thereof in reference to the accompanying drawings.

DETAILED DESCRIPTION OF THE PREFERRED EMBODIMENT

Figure 1:
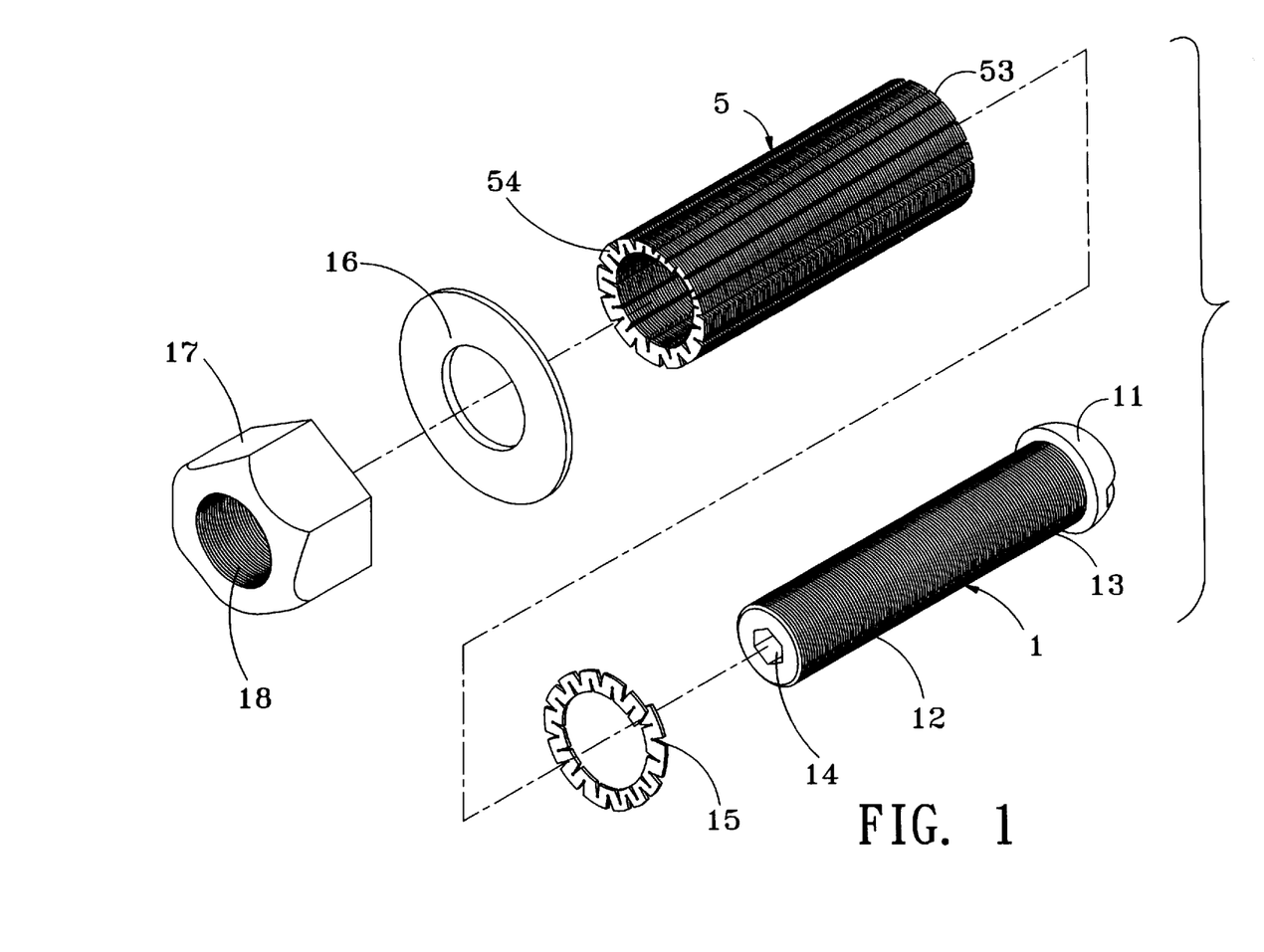
FIG. 1 is a perspective view of a bolt structure of the present invention.

Referring to the FIG. 1 firstly, the bolt structure of the present invention is comprised of an elastic washer 15, an external threaded sleeve 5, a gasket 16 and a nut 17 extended therethrough by a bolt 1.

Figure 3:
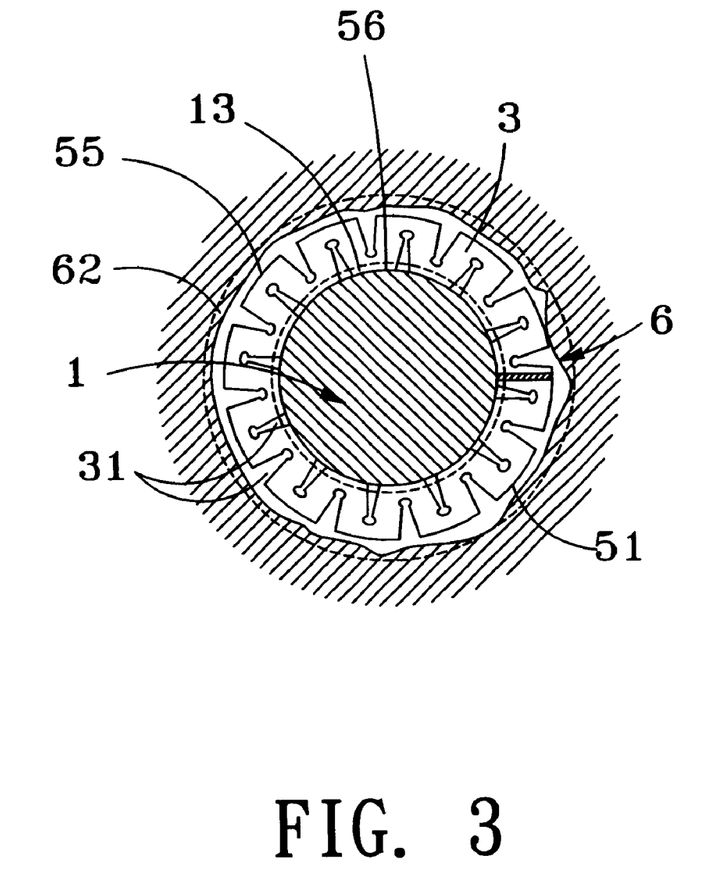
FIG. 3 is a sectional view taken from the 6—6 section line of FIG. 2.

Wherein, the external threaded sleeve 5 is comprises a single or a plurality of helix springs 3, a plurality of expansion slits 31 are provided on the internal and external peripheries of the helix springs 3 (as shown in FIG. 3).

The nut 17 is in the shape of a hexagonal nut with a screw thread 18 mating and lockable with a thread 13 on the shank 12 of the bolt 1.

One end of the bolt 1 has a bolt head 11 (as shown in FIG. 1), while the remaining thereof is the shank 12 of the bolt I with the thread 13 winding therearound to be mating and lockable with an internal edge 56 of the external threaded sleeve 5 (as shown in FIG. 3). The shank 12 of the bolt 1 is provided on the other end with a hexagonal countersunk head 14 (as shown in FIG. 1).

Figure 2:
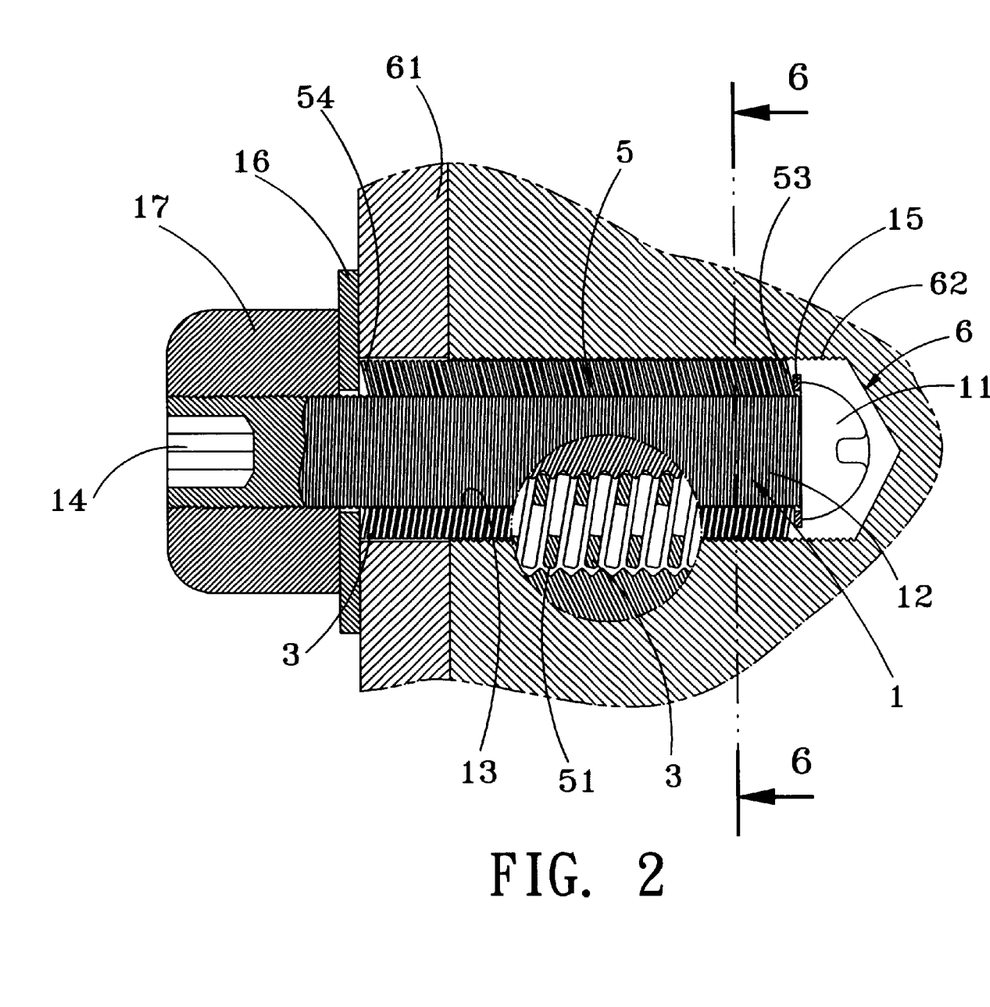
FIG. 2 is a sectional view showing the bolt structure of the present invention in a hole with a fine screw thread.

With the abovementioned improved structure of the bolt 1, when it is used in assembling with a fine screw thread, the external threaded sleeve 5 is composed of a single helix spring 3 (as shown in FIG. 3). The bolt head 11 of the bolt 1 abuts against the elastic washer 15 which in turn abuts against the front end 53 of the external threaded sleeve 5, then the nut 17 and the gasket 16 are locked by rotating onto the bolt 1 to be tightly abutted against the tailing end 54 of the external threaded sleeve 5 and an article 61 to be mounted and locked, thus the fine screw thread 51 on the external threaded sleeve 5 over the bolt 1 is restrained (as shown in FIG. 2).

When the bolt 1, the helix spring 3 and a threaded hole 6 in the article 61 have not yet been forced to get together, the thread 13 of the bolt 1 contacts steadily with the internal edge 56 of the external threaded sleeve 5, while the external edge 55 of the external threaded sleeve 5 also contacts steadily with a fine screw thread 62 in the threaded hole 6; these three members leave a small space for detaching or locking by rotating (as shown in FIG. 3).

When the nut 17 is rotated for adjustment, the bolt 1 will advance under rotation of the nut 17 along its own thread. During the process of adjustment, the thread 13 on the shank 12 of the bolt 1 can synchronically push the helix spring 3 in a corresponding section containing a plurality of screw pitches of the external threaded sleeve 5, the helix spring 3 with the cross section of each ring thereof in the shape of ")" can thus forcedly abut against the bolt 1 inwardly as well as the threaded hole 6 outwardly in a way of confining and expanding respectively as a compression spring (as shown in FIG. 4).

Figure 5:
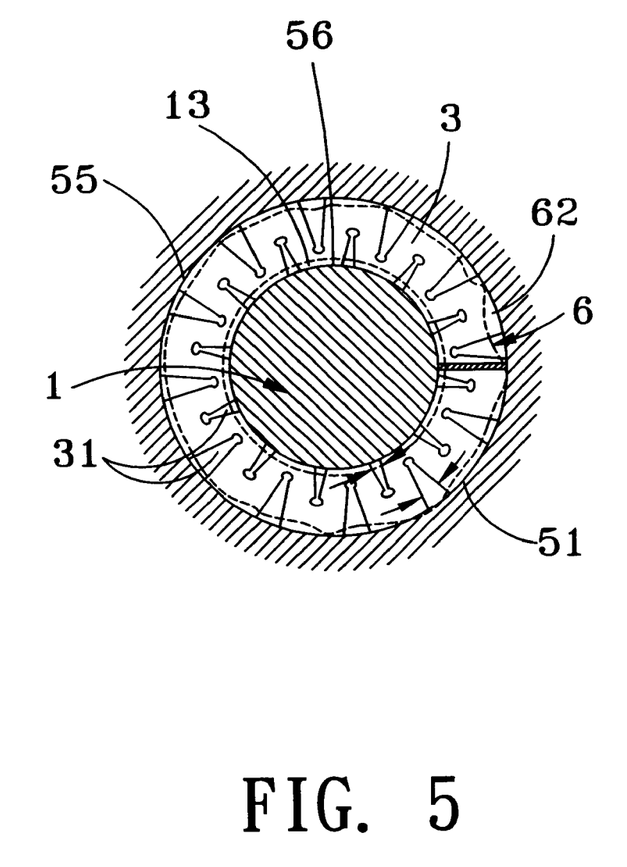
FIG. 5 is a sectional view taken from the 6a—6a section line of FIG. 4.

When the bolt 1, the helix spring 3 and the threaded hole 6 in the article 61 are forced to get together, by virtue that the helix spring 3 expands as a compression spring, the internal edge 56 of the external threaded sleeve 5 can thereby snugly fit the thread 13 of the bolt 1, and the external edge 55 of the external threaded sleeve 5 also snugly fit the fine screw thread 62 in the threaded hole 6 (as shown in FIG. 5).

Figure 4:
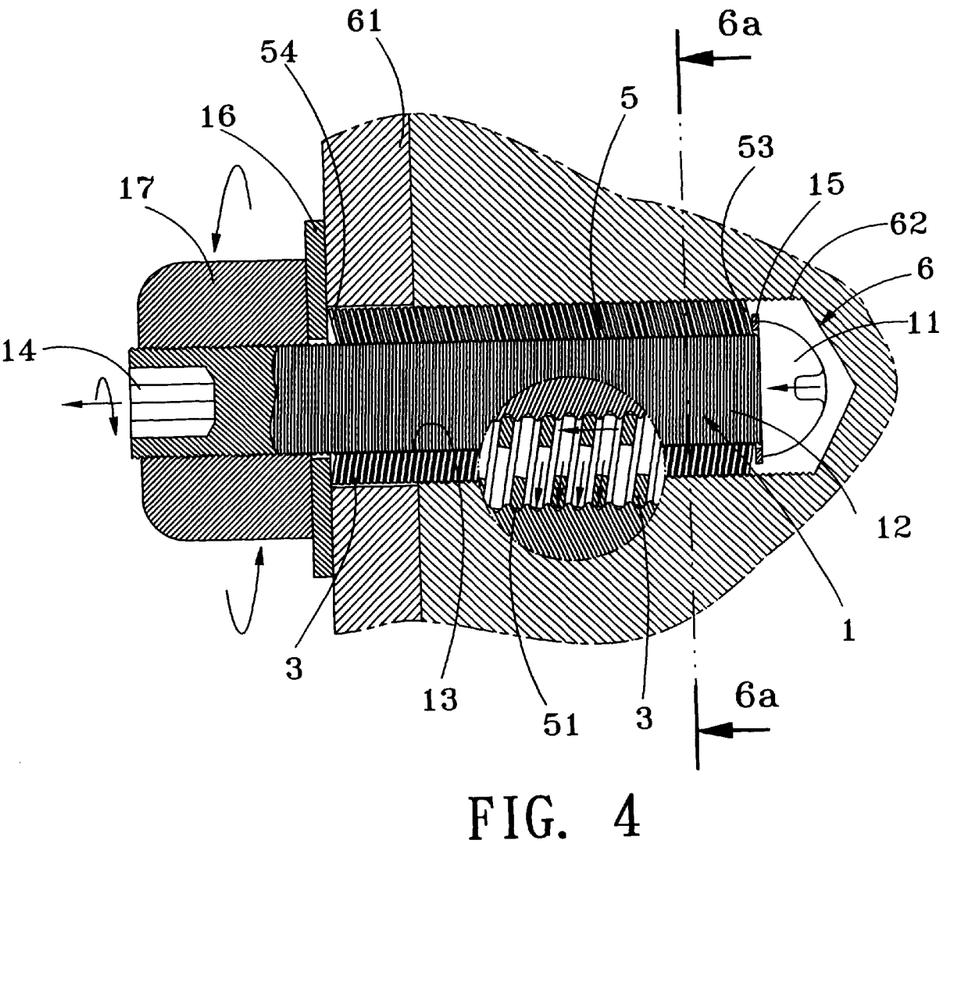
FIG. 4 is a sectional view showing the bolt structure of the present invention in a pressing tight state in the hole with the fine screw thread.
Figure 6:
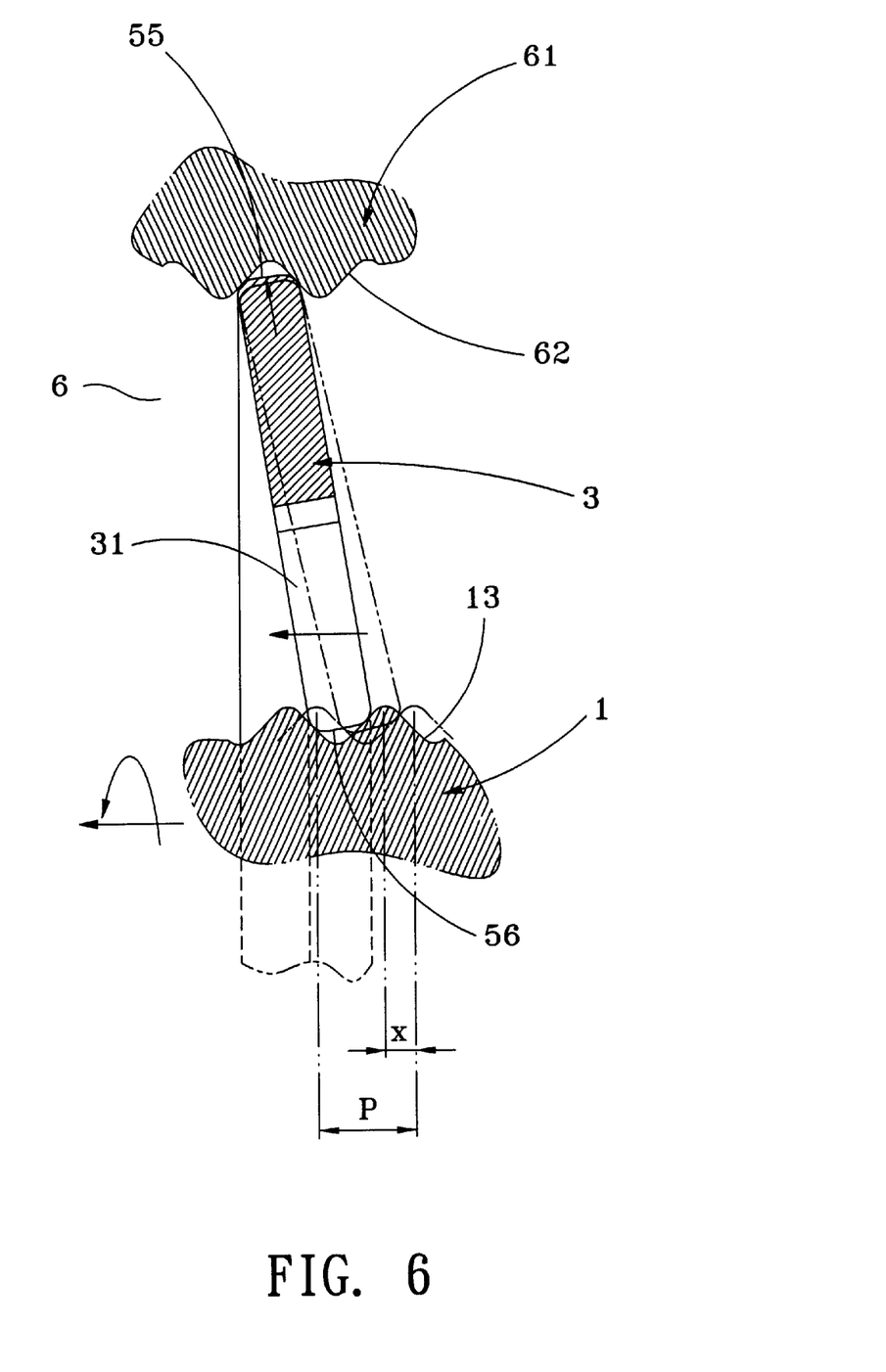
FIG. 6 is a partial sectional view showing operation of a unit tooth of the helix spring of the present invention.

When in adjusting the nut 17 (as shown in FIG. 4), the bolt 1 will be led rotationally by the nut 17 to move forward along the thread and to press the external threaded sleeve 5, the external edge 55 of the external threaded sleeve 5 abuts against the fine screw thread 62 in the threaded hole 6 (as shown in FIG. 5); the bolt 1 is kept on rotating to the internal edge 56 of the external threaded sleeve 5 to abut against the thread 13 on the shank 12 of the bolt 1. Just an amount of feeding "x" is given by rotation to the bolt 1 (as shown in FIG. 6), the helix spring 3 is pressed to forcedly abut against the thread 13 on the bolt 1 and the fine screw thread 62 in the threaded hole 6 in a way of confining and expanding respectively as a compression spring; the amount of feeding "x" is smaller than any of the pitches p (x<p, as shown in FIG. 6).

Figure 7:
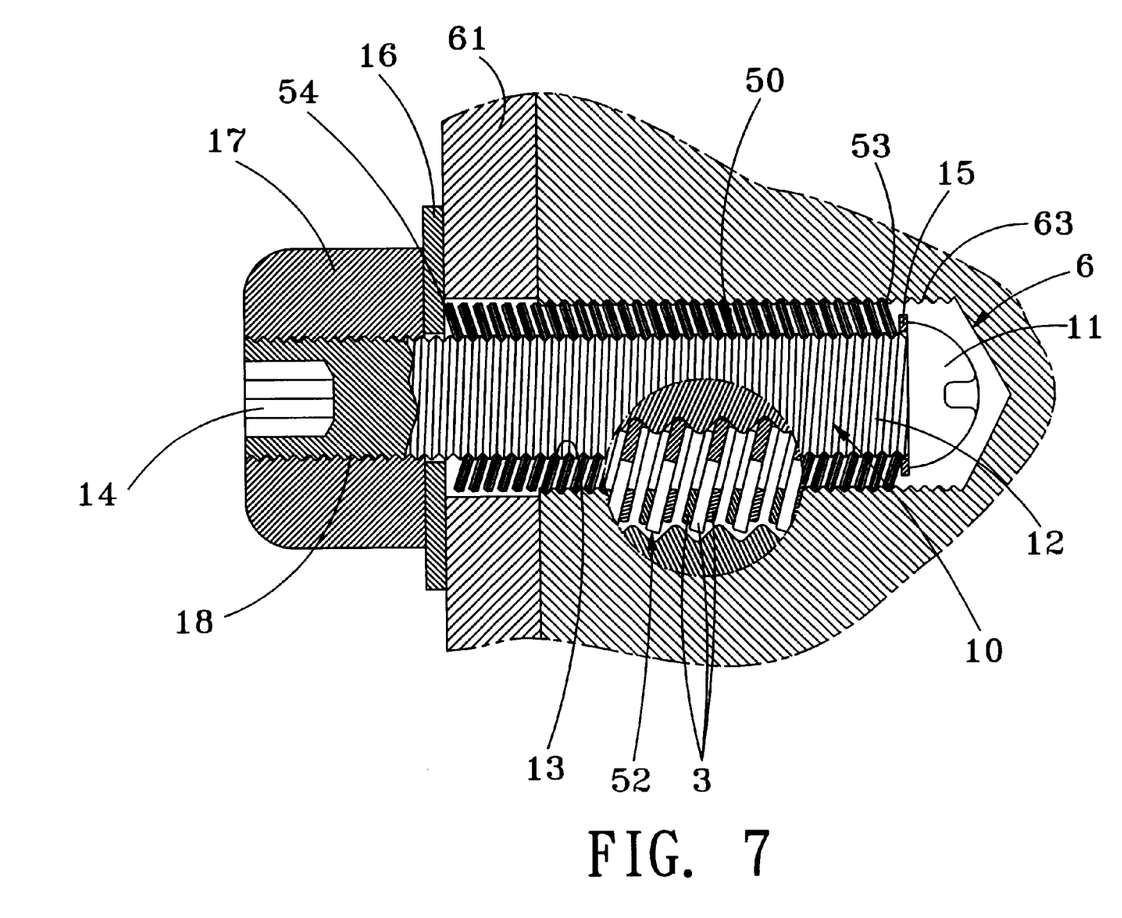
FIG. 7 is a sectional view showing the bolt structure of the present invention in a hole with a coarse screw thread.

When in the circumstances of assembling the coarse screw thread, as shown in FIG. 7, an external threaded sleeve 50 suiting pitch gauges of a coarse thread is made from a plurality of helix springs 3; and a thread 18 in a nut 17, a bolt 10 and a threaded hole 6 for assembling are all made to have coarse threads; while the remaining conditions of assembling are same as for the fine screw thread (as shown in FIG. 7).

Figure 8:
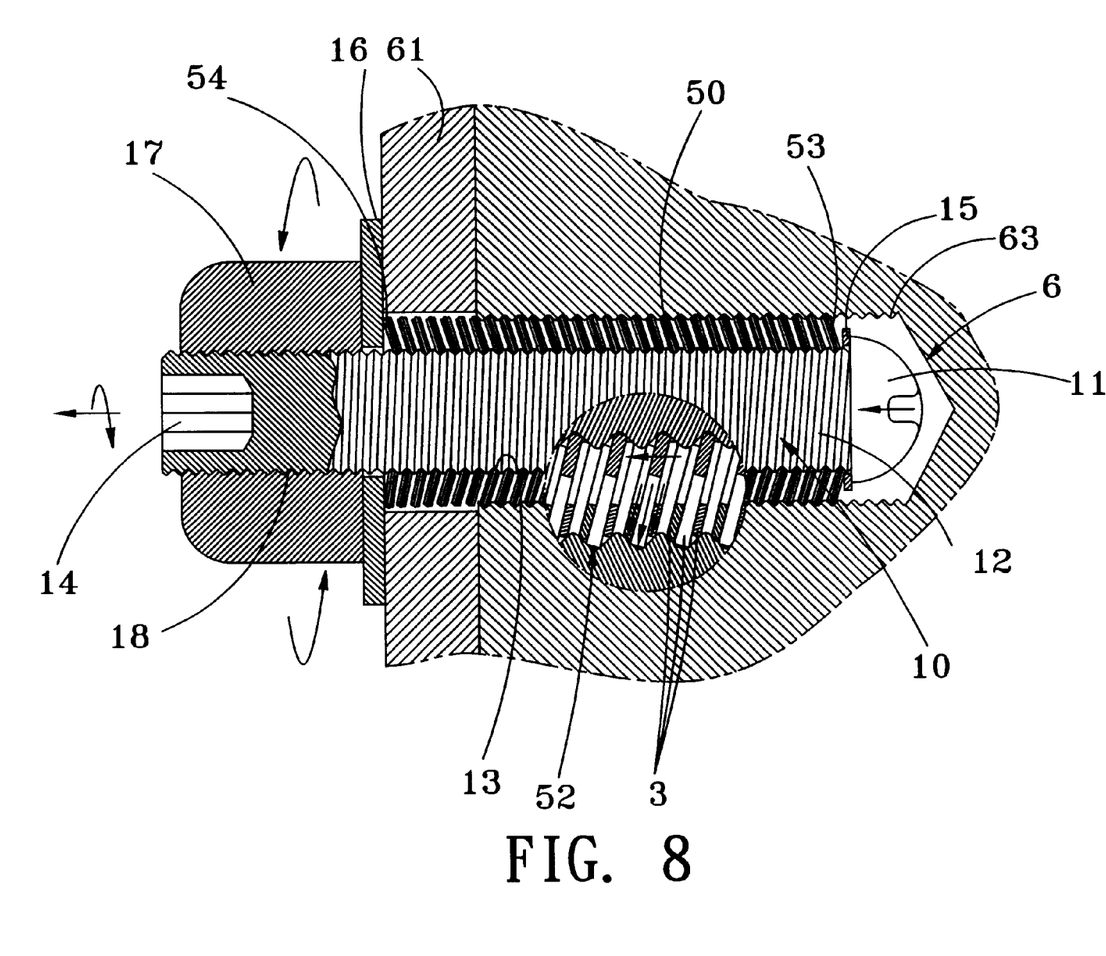
FIG. 8 is a sectional view showing the bolt structure of the present invention in a pressing tight state in the hole with the coarse screw thread.

When in adjusting the nut 17, the bolt 10 will I be led rotationally by the nut 17 to move forward along the thread, so that the thread 13 on the shank 12 of the bolt 1 can push the helix spring 3 in the pitches of the external threaded sleeve 50 synchronically during rotational adjustment thereof to render the helix spring 3 with the cross section of each ring thereof in the shape of ")" to be pressed to forcedly abut against the fine screw thread 62 in the threaded hole 6 and the bolt 10 in a way of expanding and confining respectively as a compression spring (as shown in FIG. 8).

By using the hexagonal countersunk head 14 to rotationally adjust the bolt 1, the external threaded sleeve 5 can also be pressed.

From the statement above, the improved bolt structure of the present invention can absorb vibration and uniformly scatter it along the elastic screw thread of the external threaded sleeves 5,50 as the engaging thread of the bolt 1, to thereby largely reduce possibility of loosening by vibration, thus the bolt 1 has the effect of loosening-proofness. When in the assembling circumstances where the screw threads collapse, and there are a plurality of internal and external expansion slits 31 on the internal and external peripheries of the helix spring 3, the threads can automatically and appropriately adjust to get rid of the trouble of inability of adequate pressing due to screw threads collapsing. And by providing the hexagonal countersunk head 14, the helix spring 3 functioning as a compressing spring can be easily released to obtain the object of detaching the bolt 1, thereby, the effect of preventing from dead locking can be achieved.

Figure 9:
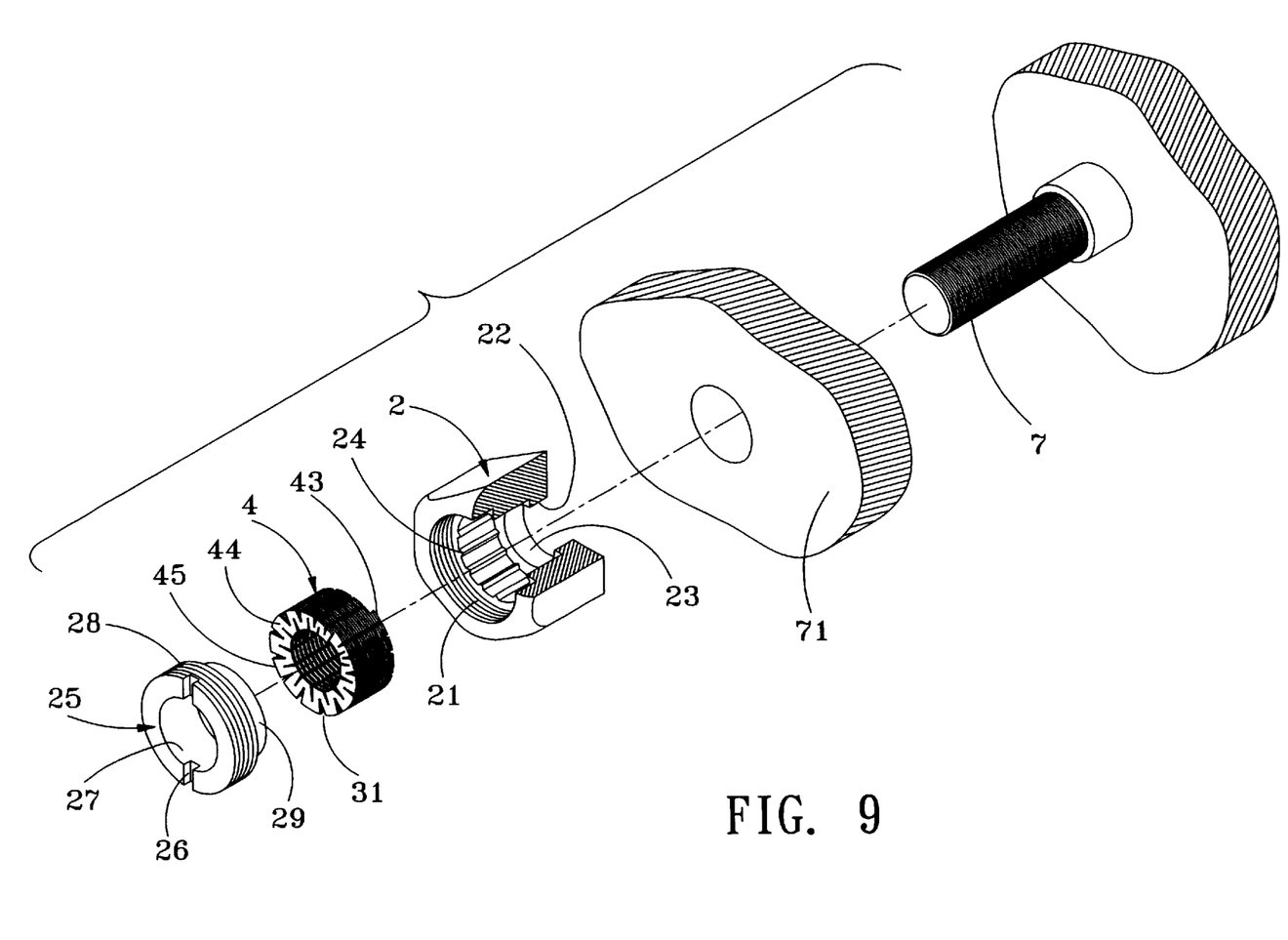
FIG. 9 is a perspective view of a nut structure of the present invention.

And as shown in FIG. 9, in the improved nut structure of the present invention, the body 2 of the nut includes an internal threaded lining 4 and a rotation plug 25, they are both screwed onto a bolt 7, the nut structure is characterized by:

The body 2 of the nut is provided on one end thereof with a neck portion 22, and the body 2 of the nut is provided therein with a thread 21 and engaging internal teeth 24 which match and engage with the expansion slits 31 on the external edge 45 of the internal threaded lining 4; while the thread 21 matches and engages with an external thread 28 on the rotation plug 25 which is provided at the neck portion 22 thereof with a hole 23 having a diameter slightly larger than that of the bolt 7.

The rotation plug 25 is provided on one end thereof with a pair of mutually aligned straight slits 26, it is provided on the other end thereof with a protuberance 29, and is provided on the external edge thereof with an external thread 28 which can match and engage with the thread 21 of the body 2 of the nut, and is provided at the center on one end thereof with a hole 27 having a diameter slightly larger that that of the bolt 7.

Figure 10:
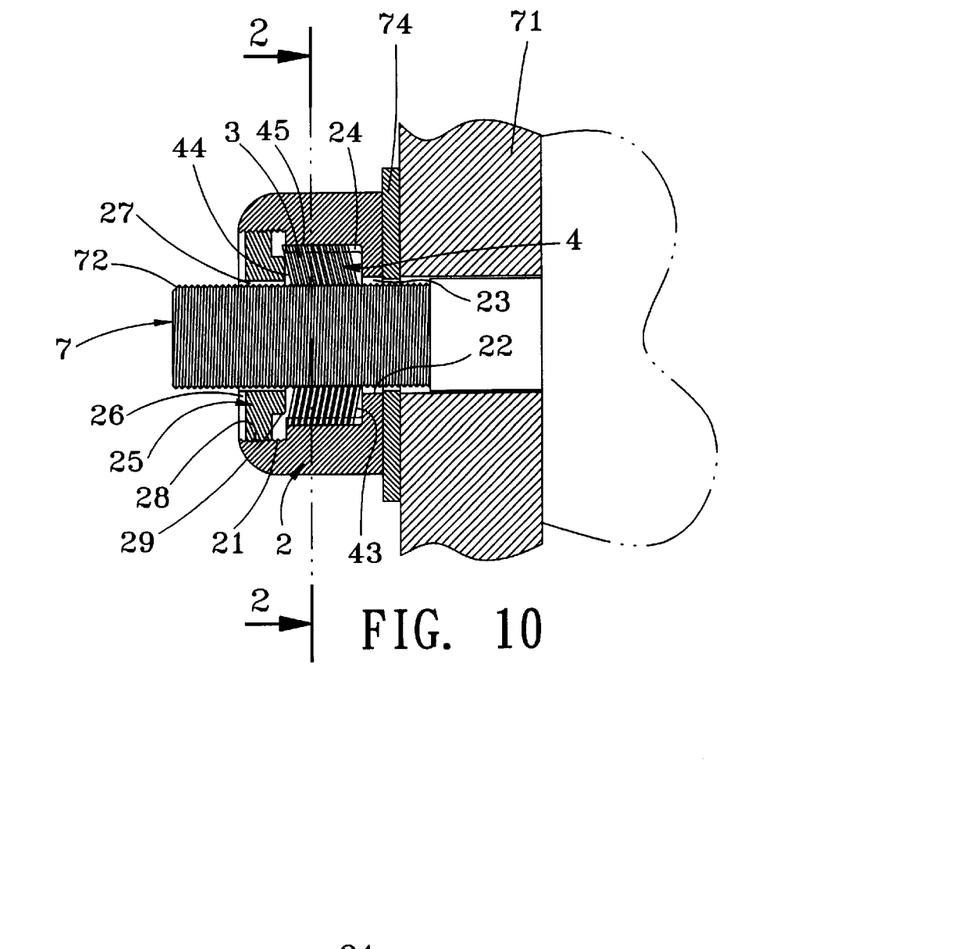
FIG. 10 is a sectional view showing the nut structure of the present invention on a bolt with a fine screw thread.

When the above nut structure of the present invention is in the circumstances of assembling the fine screw thread, the internal threaded lining 4 which is composed of a single helix spring 3 is placed in the body 2 of the nut and is locked therein by means of the rotation plug 25 to render the internal threaded lining 4 to have a fine elastic screw thread on the body 2 of the nut. Then a gasket 74 and an article 71 to be locked are tightly locked on the bolt 7 by the body 2 of the nut (as shown in FIG. 10).

When in adjusting the body 2 of the nut by rotating, by virtue that the engaging internal teeth 24 on the body 2 of the nut match and engage with the expansion slits 31 on the external edge 45 of the internal threaded lining 4, the internal threaded lining 4 can advance along the thread of the nut 17 under rotation. When the body 2 of the nut is rotated to be locked in position, the rotation plug 25 can further be locked tight to have the protuberance 29 thereof abutted against the tailing end 44 of the internal threaded lining 4 of which the front end 43 abuts against the neck portion 22 of the body 2 of the nut (as shown in FIG. 10).

Figure 11:
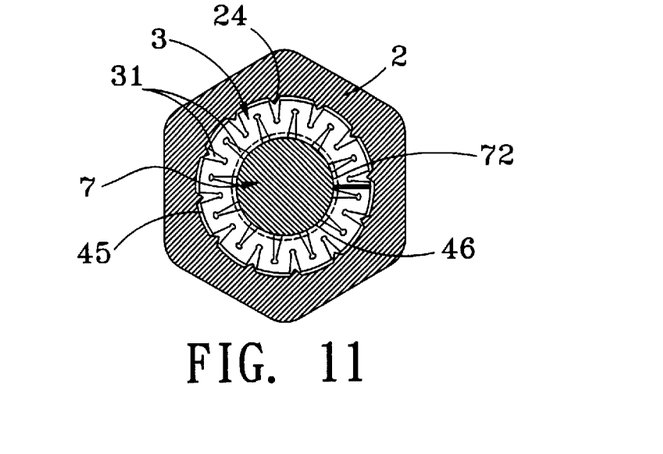
FIG. 11 is a sectional view taken from the 2—2 section line of FIG. 10.

When the body 2 of the nut, the bolt 7 and the internal threaded lining 4 have not yet been forced to get together, the engaging internal teeth 24 on the body 2 of the nut steadily engages the expansion slits 31 on the external edge 45 of the internal threaded lining 4, and the internal edge 46 of the internal threaded lining 4 also steadily engages a thread 72 on the bolt 7 (as shown in FIG. 11).

Figure 12:
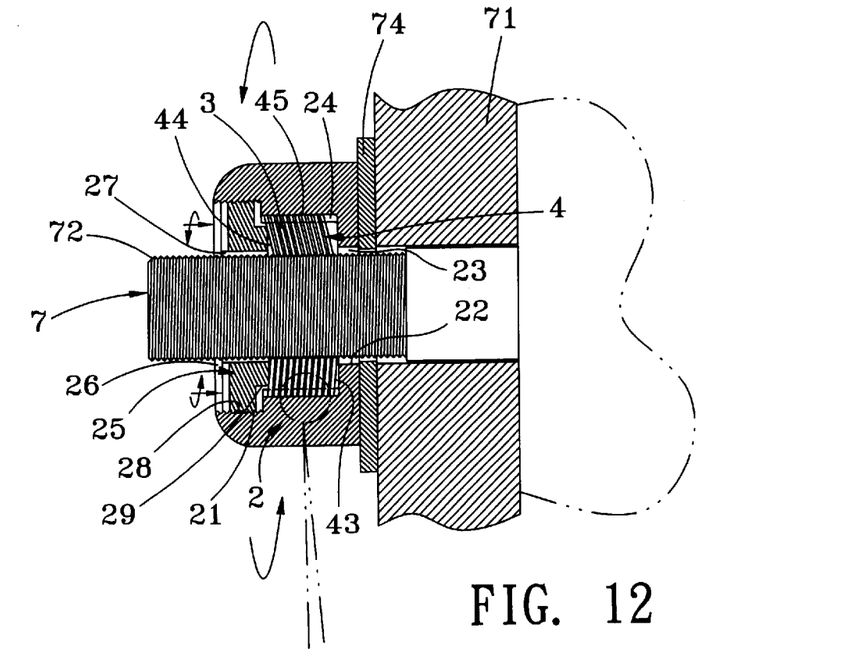
FIG. 12 is a sectional view showing the nut structure of the present invention in a pressing tight state on a bolt with a fine screw thread.

When the internal threaded lining 4 is forced to get close, just lock tight the body 2 of the nut, the body 2 of the nut can be rotated by rotating the engaging internal teeth 24 to move the internal threaded lining 4; this can make the helix spring 3 pressed to function in a way of confining and expanding respectively as a compression spring (as shown in FIG. 12).

Figure 13:
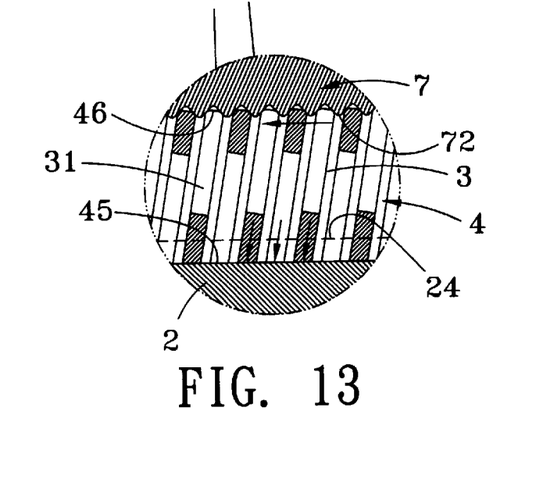
FIG. 13 is a partial sectional view showing the nut structure of the present invention on a bolt with a fine screw thread.

When the body 2 of the nut is rotated for adjusting, the engaging internal teeth 24 and the expansion slits 31 on the external edge 45 of the internal threaded lining 4 are engaged mutually, and the engaging internal teeth 24 moves forward along the thread to press the internal threaded lining 4, so that the helix spring 3 forcedly abuts against the engaging internal teeth 24 on the body 2 of the nut and a fine thread 72 on the bolt 7 in a way of expanding and confining respectively as a compression spring (as shown in FIG. 13).

Figure 14:
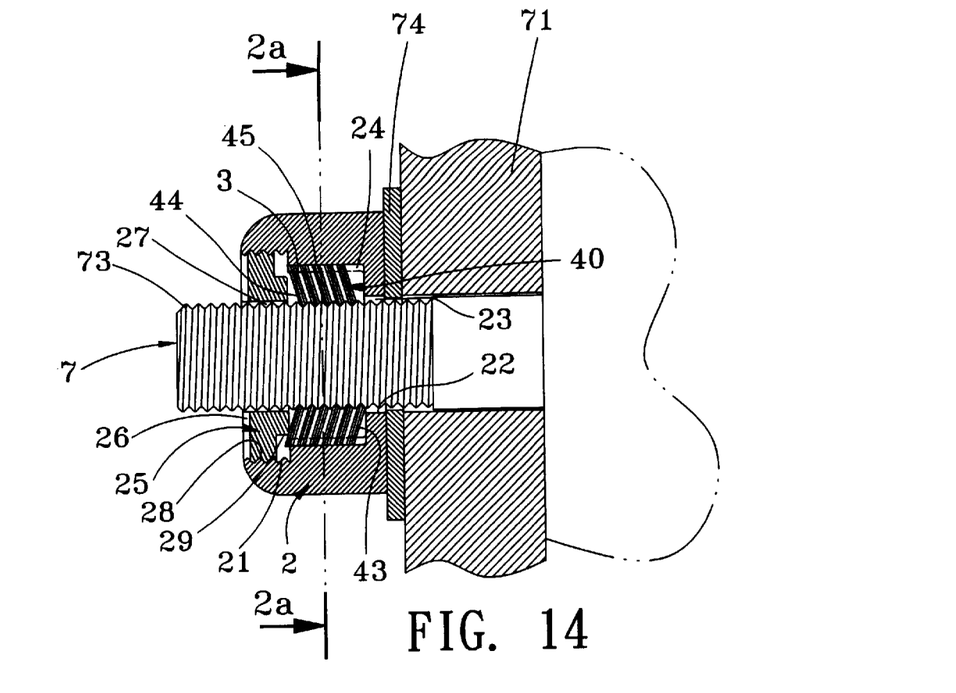
FIG. 14 is a sectional view showing the nut structure of the present invention on a bolt with a coarse screw thread.

In other words, if the above nut structure of the present invention is applied in the circumstances of assembling the coarse screw thread, a plurality of helix springs 3 are made to suit an internal threaded lining 40 with pitch gauge of a coarse thread. The thread 21 of the body 2 of the nut and the bolt 7 are both made to have coarse threads, the remaining conditions of assembling are same as for the fine screw thread (as shown in FIG. 14).

Figure 15:
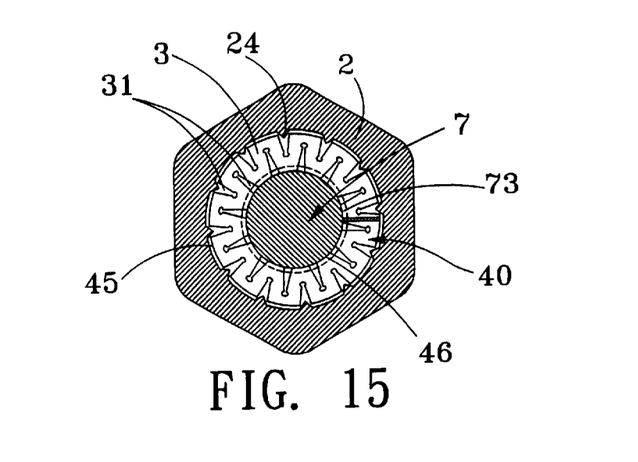
FIG. 15 is a sectional view taken from the 2a—2a section line of FIG. 14.

When the body 2 of the nut, the bolt 7 and the internal threaded lining 40 have not yet been forced to get together, the engaging internal teeth 24 on the body 2 of the nut steadily engages the expansion slits 31 on the external edge 45 of the internal threaded lining 40, and the internal edge 46 of the internal threaded lining 40 also steadily engages a thread 73 on the bolt 7 (as shown in FIG. 15).

Figure 16:
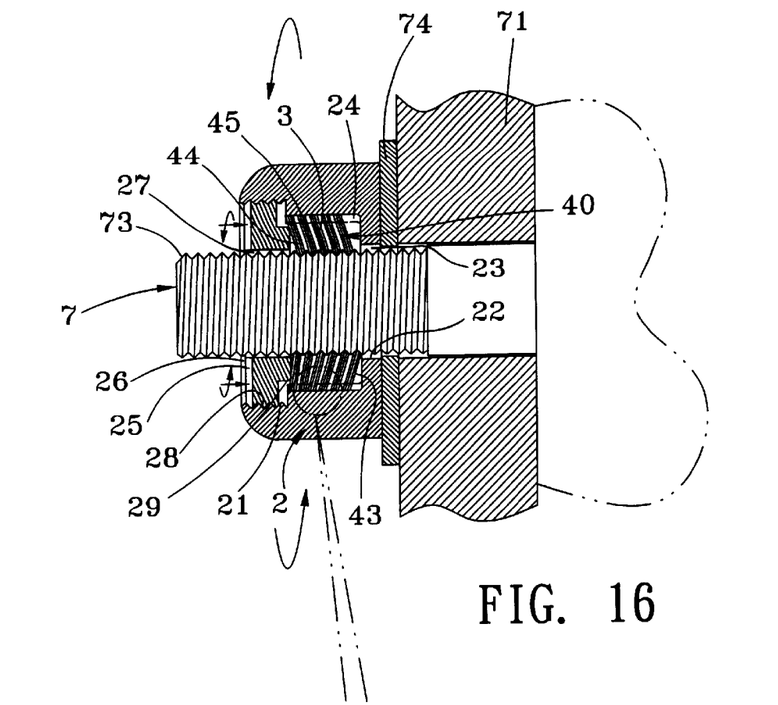
FIG. 16 is a sectional view showing the nut structure of the present invention on a bolt with a coarse screw thread.

When the internal threaded lining 40 is forced to get close, just lock tight the body 2 of the nut, the body 2 of the nut can be rotated by rotating the engaging internal teeth 24 to move the internal threaded lining 40; this can make the helix springs 3 pressed to function in a way of confining and expanding respectively as compression springs (as shown in FIG. 16).

Figure 17:
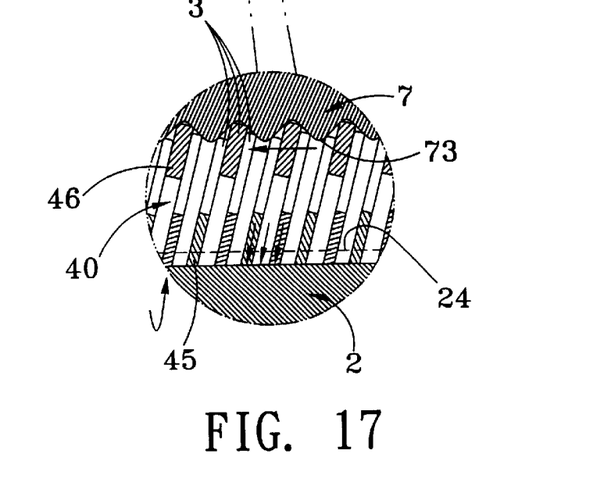
FIG. 17 is a partial sectional view showing the nut structure of the present invention on a bolt with a coarse screw thread.

When the body 2 of the nut is rotated for locking, the engaging internal teeth 24 and the expansion slits 31 on the external edge 45 of the internal threaded lining 40 are engaged mutually, and the engaging internal teeth 24 moves forward along the thread to press the internal threaded lining 40, so that the helix springs 3 forcedly abut against the engaging internal teeth 24 on the body 2 of the nut and a thread 73 on the bolt 7 in a way of expanding and confining respectively as a compression spring (as shown in FIG. 17).

If it is needed to rotate more tightly, the rotation plug 25 can be rotated in a way of micro-adjustment, now the protuberance 29 of the rotation plug 25 abuts on the tailing end 44 of the internal threaded lining 40. In moving forward the rotation plug 25 in the way of micro-adjustment, the protuberance 29 simultaneously moves forward the internal threaded lining 40 along the engaging internal teeth 24 to press the helix springs 3 which in turn forcedly abut against the engaging internal teeth 24 on the body 2 of the nut and the thread 73 on the bolt 7 in a way of confining and expanding respectively as a compression spring.

From the statement above, the improved nut structure of the present invention can absorb vibration and uniformly scatter it along the elastic screw thread of the of the internal threaded lining 4,40 as the internal thread of the body 2 of the nut, to thereby largely reduce possibility of loosening by vibration, thus the body 2 of the nut has the effect of loosening-proofness. When in the assembling circumstances where the screw threads collapse, and there are a plurality of internal and external expansion slits 31 on the internal and external peripheries of the helix springs 3, the threads can automatically and appropriately adjust to get rid of the trouble of inability of adequate pressing due to screw threads collapsing. And by providing the rotation plug 25 of the body 2 of the nut, the helix springs 3 functioning as compressing springs can be easily released to obtain the object of detaching the body 2 of the nut, thereby, the effect of preventing from dead locking can be achieved.

The embodiments stated above of the present invention are expressed with triangle screw threads, in practice, square and trapezoid threads screw etc. can all be applied and fall within the scope of the present invention.

In conclusion, the present invention surely can have the effect of preventing from dead locking and loosening-proofness, and can be used in the assembling circumstances where the screw threads collapse. When it is to deal with the collapsing screw threads, it is easier and more convenient than the conventional techniques designed and applied in the art, besides, it has the effect of preventing from dead locking, anti-vibration as well as loosening-proofness. Moreover, the structure of the present invention cost lower (especially in manufacturing the internal threaded lining and the external threaded sleeve). And there has never been such a thought and application of the present invention in the art; the present invention surely is advanced and valuable in the industry. Having thus described my invention,

What I claim as new and desire to be secured by Letters Patent of the United States are:

1. An improved bolt and nut combination comprising:
    at least one external threaded sleeve that threads onto a threaded portion of a bolt; wherein
        said external threaded sleeve is formed as a helix spring with a plurality of expansion slits provided on both an internal periphery and an external periphery of said external threaded sleeve, and wherein
        a nut and said external threaded sleeve are threaded onto said bolt so as to establish an elastic expanding holding action for a threaded hole in an article to be secured.

2. The improved bolt and nut combination as claimed in claim 1, wherein:
    a plurality of said external threaded sleeves are provided, exterior threads of said external threaded sleeves having varying pitch gauges, so that said bolt and nut combination can accommodate articles to be secured that have threads with varying pitch gauges.

3. An improved bolt and nut combination comprising:
    a nut,
    at least one internal threaded lining, and
    a rotation plug; wherein
        a body of said nut comprises at one end thereof a neck portion, and an interior of said body of said nut comprises a thread and engaging internal teeth which engage expansion slits on an external edge of said internal threaded lining,
        said thread engages an external thread on said rotation plug,
        said internal threaded lining is formed as a helix spring with a plurality of expansion slits provided on both an internal periphery and an external periphery of said internal threaded lining,
        said expansion slits on said external edge of said internal threaded lining engage said engaging internal teeth, and
        an internal edge of said internal threaded lining mates and locks with a thread on a bolt; such that
        when said body of said nut is rotated, said internal threaded lining advances along said thread of said nut, thereby creating an elastic holding action relative to said bolt.

4. The improved bolt and nut combination as claimed in claim 3, wherein:
    a plurality of said internal threaded linings are provided, internal threads of said internal threaded sleeves having varying pitch gauges, so that said nut can accommodate bolts that have threads with varying pitch gauges.

5. The improved bolt and nut combination as claimed in claim 3, wherein:
    a first end of said rotation plug comprises a pair of aligned straight slits,
    a second end of said rotation plug comprises a protuberance, and
    said external edge of said internal threaded lining comprises an external thread which engages said thread of said body of said nut, and said internal threaded lining comprises at a center on one end thereof a hole having a diameter slightly larger than a diameter of said bolt.

* * * * *